United States Patent [19]

Eckert et al.

[11] Patent Number: 4,581,034

[45] Date of Patent: Apr. 8, 1986

[54] FINISHING LEATHER WITH A SYNTHETIC CARBOXYLATED RUBBER DISPERSION

[75] Inventors: Günter Eckert, Limburgerhof; Wolfgang Groh, Mannheim; Hans Lütje, Frankenthal; Franz Schmidt, Mannheim; Jürgen Schmidt-Thümmes, Ludwigshafen, all of Fed. Rep. of Germany

[73] Assignee: BASF Aktiengesellschaft, Ludwigshafen, Fed. Rep. of Germany

[21] Appl. No.: 610,406

[22] Filed: May 15, 1984

[30] Foreign Application Priority Data

May 19, 1983 [DE] Fed. Rep. of Germany ....... 3318219

[51] Int. Cl.[4] ....................... D06M 19/00; B32B 9/02; C14C 9/00

[52] U.S. Cl. .................................. 8/94.1 R; 428/473; 428/540

[58] Field of Search ....................... 428/151, 473, 540; 8/94.1 R

[56] References Cited

U.S. PATENT DOCUMENTS

| | | | |
|---|---|---|---|
| 2,949,386 | 8/1960 | Cassel | 428/288 |
| 3,344,103 | 9/1967 | Eilbeck | 524/821 |
| 3,865,622 | 2/1975 | Blair | 428/151 |
| 4,330,597 | 5/1982 | Heins | 428/473 |

FOREIGN PATENT DOCUMENTS

| | | |
|---|---|---|
| 822231 | 10/1959 | United Kingdom . |
| 900591 | 7/1962 | United Kingdom . |
| 921798 | 3/1963 | United Kingdom . |

OTHER PUBLICATIONS

Chem. Abstract 97:164,897b, Gevorkyan.

*Primary Examiner*—Theodore Morris
*Attorney, Agent, or Firm*—Oblon, Fisher, Spivak, McClelland & Maier

[57] ABSTRACT

Leather is finished with a synthetic carboxylated rubber dispersion to which as much as 50% by weight of one or more oxides and/or hydroxides of divalent and/or trivalent metals may have been added, finishing being carried out by a process in which the carboxylated rubber dispersion is prepared by the emulsion feed method, with a conversion of more than 90%, in such a way that it contains from 20 to 60% by weight of carboxylated rubber which is soluble in dimethylformamide at room temperature.

6 Claims, No Drawings

FINISHING LEATHER WITH A SYNTHETIC CARBOXYLATED RUBBER DISPERSION

The present invention relates to a process for finishing leather with a carboxylated rubber dispersion based on butadiene and/or isoprene and styrene, with or without oxides and/or hydroxides of divalent and/or trivalent metals.

In the finishing of full grain, buffed or split leather, its surface is treated with a mixture of a binder and a pigment in order to close the pores of the leather at the surface. Binders frequently used for this purpose are aqueous polyacrylate dispersions, aqueous dispersions of vinyl acetate copolymers or aqueous dispersions of synthetic rubbers, i.e. copolymers of 1,3-dienes, such as butadiene, isoprene or chloroprene. Either organic or inorganic pigments can be used, for example iron oxide, titanium dioxide, kaolin, phthalocyanine or azo pigments. Moreover, finishes of this type can contain thickeners, for example those based on cellulose, e.g. carboxymethylcellulose, polyvinyl alcohols, polyacrylic acid or its salts, casein or polymers of N-vinylpyrrolidone.

However, binders of the stated type are not suitable for finishing splits, for example for upper leather, since they cannot readily be embossed and possess poor cold flexibility and inadequate dry and wet flexing endurance.

Aqueous dispersions of carboxyl-containing synthetic rubbers have also been used as binders for finishing leather. In the process described in British Pat. No. 822,231, addition of zinc compounds gives a finish which has improved resistance to hot plating but poorer gloss, fullness, covering power and handle, and which, when various layers are applied, results in poor wet flexing endurance because the layers adhere inadequately to one another. The finishes which are disclosed in British Pat. Nos. 921,798 and 900,591 and based on completely polymerized carboxyl-containing rubber dispersions also possess unsatisfactory dry flexing endurance.

Finally, U.S. Pat. No. 3,330,597 discloses a process for finishing leather, in which the carboxylated synthetic rubber latex used has not been completely polymerized and has had the remaining monomers removed from it. The rubber is prepared by a batch procedure (single-stage process), by emulsion polymerization of from 1 to 10 parts by weight of $\alpha,\beta$-monoethylenically unsaturated aliphatic carboxylic acids and from 90 to 99 parts by weight of a mixture of acyclic conjugated dienes of 4 to 9 carbon atoms and vinylaromatics of 8 to 12 carbon atoms and/or (meth)acrylonitrile, the mixture containing no more than 50 parts by weight of the latter. The finishing agent contains from 0.5 to 50% by weight, based on the rubber, of one or more oxides and/or hydroxides of divalent metals, e.g. zinc oxide or magnesium hydroxide. Although finishes for splits which are prepared by this process provide good sealing and covering power and result in a good grain pattern and good stretchiness, cold flexibility, adhesion and dry and wet flexing endurance, they cannot be readily embossed and their stacking tack is unsatisfactory.

We have found that leather can be advantageously finished with a synthetic carboxylated rubber dispersion, which is prepared by emulsion polymerization of (A) from 1 to 10 parts by weight of $\alpha,\beta$-monoethylenically unsaturated carboxylic acids of 3 to 5 carbon atoms and (B) from 90 to 99 parts by weight of a mixture of
   (a) from 10 to 90 parts by weight of butadiene and/or isoprene and
   (b) from 10 to 90 parts by weight of styrene and/or acrylonitrile, the mixture containing not more than 50 parts by weight of acrylonitrile, and removal of the remaining monomers, and to which from 0 to 50% by weight, based on the carboxylated rubber, of one or more oxides and/or hydroxides of divalent or trivalent metals are added, if the synthetic carboxylated rubber latex is prepared by the emulsion feed method, with a conversion of more than 90%, in such a way that it contains from 20 to 60% by weight of carboxylated rubber which is soluble in dimethylformamide at room temperature.

Because of the improved processability, in particular the reduced stacking tack, carboxylated rubber dispersions of this type do not require the addition of oxides and/or hydroxides of divalent and/or trivalent metals. However, it is preferable to use such oxides and/or hydroxides, in particular zinc oxide, zinc hydroxide, magnesium oxide or magnesium hydroxide, and to employ these in a conventional manner as a paste which additionally contains wetting agents and may contain other additives. Because of the reduced stacking tack, it is possible in general to use smaller amounts of oxides and/or hydroxides of the stated type in the novel process than the amounts used in the process described in U.S. Pat. No. 3,330,597. The amount of oxides and/or hydroxides of divalent and/or trivalent metals is frequently from 0 to 50, in general from 0.5 to 50, preferably from 0.5 to 10, % by weight, based on the solid carboxylated rubber.

The aqueous dispersion of the synthetic carboxylated rubber which is employed for finishing generally has a concentration of carboxylated rubber of from 30 to 60, in particular from 35 to 55, % by weight. In the preparation by the emulsion feed method, which is carried out in a conventional manner, some of the monomer mixture in emulsified form, together with an appropriate amount of the emulsifier, the polymerization initiator and a regulator, is initially taken in water, the mixture is heated to the polymerization temperature and, when the polymerization starts, the remaining monomer emulsion, which contains the emulsifier and in general a regulator, and an aqueous solution of the polymerization initiator are run in separately, at the rate at which they are consumed. The reaction is generally allowed to continue until the conversion is above 90%, in general from 95 to 98%. The polymerization temperature chosen is generally from 45° to 65° C., and a conventional water-soluble free-radical polymerization initiator, such as sodium or ammonium persulfate, or a redox catalyst, such as tert.-butyl perbenzoate/formaldehyde sulfoxylate/iron(II) sulfate or tert.-butyl hydroperoxide/ascorbic acid/iron(II) sulfate, is generally employed. Water-soluble persulfates of the stated type are preferred. Suitable emulsifiers are the conventional anionic and non-ionic ones, anionic emulsifiers being particularly important. The emulsifiers used are preferably sodium laurylsulfate or alkylarylsulfonates where alkyl is generally of 7 to 12 carbon atoms.

The aqueous carboxylated rubber dispersions contain, as copolymerized units, from 1 to 10, preferably from 1 to 5, parts by weight of $\alpha,\beta$-monoethylenically unsaturated carboxylic acids of 3 to 5 carbon atoms, such as acrylic acid, methacrylic acid, maleic acid and/or itaconic acid, acrylic acid being preferred. The polymers contain, as copolymerized monomers (a), butadiene or isoprene or a mixture of these, butadiene polymers being preferred. The amount of butadiene and/or isoprene is preferably from 40 to 60 parts by weight. The polymers should contain not less than 10 parts of styrene and may also contain as much as 50 parts by weight of acrylonitrile as copolymerized units. The total amount of styrene and acrylonitrile should not exceed 90 parts by weight. As much as 25 parts by weight of the monomers (b) can be replaced by other copolymerizable monomers, but the total amount of water-soluble monomers should not exceed 10% by weight, based on the polymer. Examples of suitable additional water-soluble monomers are acrylamide, methacrylamide, N-methylolacrylamide, N-methylolmethacrylamide, vinylsulfonic acid and its water-soluble salts and allylsulfonic acid and its water-soluble salts. Examples of further, water-insoluble monomers are acrylates and methacrylates, such as methyl acrylate, methyl methacrylate, ethyl acrylate, n-butyl acrylate, n-butyl methacrylate, tert.-butyl acrylate, isobutyl acrylate, isobutyl methacrylate, 2-ethylhexyl acrylate and 2-ethylhexyl methacrylate, vinyl esters, such as vinyl acetate and vinyl propionate, and vinyl halides, such as vinyl chloride and vinylidene chloride, as well as hydroxyalkyl acrylates and methacrylates, e.g. 2-hydroxyethyl acrylate, 2-hydroxyethyl methacrylate, butane-1,4-diol monoacrylate and 3-hydroxypropyl acrylate.

In the preparation of aqueous carboxylated rubber dispersions, regulators are generally present in conventional amounts of from 0.3 to 1% by weight, based on the amount of monomers. Examples of suitable regulators are tetrabromoethane, dialkyl dixanthogenates and preferably alkyl mercaptans, in particular dodecyl mercaptan. By appropriately matching the polymerization temperature, the composition of the monomers and the type and amount of the emulsifier and of the regulator, the polymerization can be controlled in a conventional manner so that the resulting polymer contains from 20 to 60, preferably from 25 to 50, % by weight of carboxylated rubber (solid) which is soluble in dimethylformamide at room temperature. Although the preparation of the rubber dispersions is generally carried out in the absence of chain terminators, the novel process still gives leather finishes which have very good dry and wet flexing endurance which, despite greater ease of embossing and reduced stacking tack, is not inferior to the flexing endurance of the leather finished by the process described in U.S. Pat. No. 3,330,597.

In the preparation of mixtures for finishing leather, the oxides or hydroxides of the divalent or trivalent metals can be mixed with conventional wetting agents, generally in an amount of from 20 to 60% by weight, non-ionic wetting agents being preferred. Organic solvents, e.g. methyl, ethyl, n-propyl or isopropyl alcohol, ethylglycol monoethyl ether, ketones, e.g. acetone or methyl ethyl ketone, natural or synthetic oils, e.g. neatsfoot oil, peanut oil or Turkey red oil, in free and/or emulsified form, and antifoams can also be added. Mixtures of this type are preferably used in the novel process in the form of pastes. Commercial pigment pastes may also be used in finishing leather.

The novel process can be used for finishing full grain, buffed and in particular split leather, or leather fiber materials. The finishing agent can be applied to the leather in a conventional manner, using the aqueous synthetic carboxyl-containing rubber dispersion, pigment formulations of the above type and other additives. The application can be carried out by casting, knife-coating, painting, spraying, brushing or plush-weaving. The amount of finishing agent depends on the type of leather and its pretreatment, and can easily be determined by preliminary experiments.

In general, a bottom is applied in one or more coats, and the bottom is thoroughly melted to provide a good seal by hot, strong intermediate plating or embossing.

In the novel finishing process, the viscosity of the coating can be controlled in a conventional manner by means of thickeners; an increase in viscosity results in a reduction in the penetrating power and hence in greater fullness, which is particularly important in the finishing of splits and leather fiber materials.

Examples of suitable top seasons on leather finished according to the invention are conventional polyurethane finishes, nitrocellulose lacquers or nitrocellulose lacquer emulsions and aqueous polyacrylate or polyurethane dispersions, these being applied by spraying or casting.

The leathers finished by the novel process dry very rapidly and have excellent dry and wet flexing endurance, good cold flexibility and very good crock fastness, interlayer adhesion and fullness, and can be readily embossed. Moreover, they exhibit greatly reduced stacking tack compared with the finishes described in U.S. Pat. No. 3,330,597. This is surprising in view of the virtually complete polymerization during the preparation of the binder dispersion and in view of the disclosure in U.S. Pat. No. 3,330,597 and in British Pat Nos. 921,798 and 900,591.

The proportions of soluble carboxylated rubber stated below are determined as follows:

A 30% strength aqueous dispersion of the carboxylated rubber is cast to give a film, which is dried and then stored for 48 hours in a conditioned chamber at 25° C. and 70% relative humidity. A 1 $cm^2$ piece of the resulting film is stored for 24 hours in dimethylformamide (which has been dried over a 4 Å molecular sieve), the dimethylformamide is poured off through a quartz filter, and the residue is dried for 5 hours in a drying oven at 120° C. The amount of dissolved material is calculated from the weight of the dimethylformamide residue obtained on cooling in a desiccator.

In the Examples which follow, parts and percentages are by weight, unless stated otherwise. Parts by volume bear the same relation to parts by weight as that of the liter to the kilogram.

I. PREPARATION OF THE AQUEOUS DISPERSIONS OF THE CARBOXYLATED RUBBERS

Dispersion 1

7.5 parts of water, 0.09 part of sodium peroxodisulfate and 7.5 parts of an emulsion prepared from 30.9 parts of water, 15 parts of butadiene, 8.1 parts of acrylonitrile, 5.1 parts of styrene, 0.9 part of acrylic acid, 0.18 part of tert.-dodecylmercaptan, 0.3 part of sodium laurylsulfate, 0.9 part of methacrylamide and 0.3 part of the sodium salt of dodecylbenzenesulfonic acid are initially taken in an autoclave equipped with a stirrer and having a capacity of 160 parts by volume. The mixture is heated at 55° C., and initial polymerization is carried out for 10 minutes. The remainder of the emulsion is then added uniformly in the course of 3 hours, after which polymerization is continued at 55° C. until the solids content reaches 42% (about 94% conversion of the monomers). The resulting dispersion 1 is freed from residual monomers by passing nitrogen through the mixture. The soluble fraction of the polymer present in the dispersion corresponds to 23%.

Dispersion 2

5 parts of water, 0.01 part of sodium laurylsulfate, 0.04 part of sodium pyrophosphate, 0.005 part of sodium ethylenediaminetetraacetate, 0.0025 part of sodium formaldehydesulfoxylate dihydrate and 2 parts of an emulsion consisting of 5.4 parts of butadiene, 1 part of acrylonitrile, 3 parts of styrene, 0.3 part of acrylic acid, 0.3 part of methacrylamide, 0.06 part of tert.-dodecylmercaptan, 0.1 part of sodium laurylsulfate and 8.2 parts of water and 0.5 part by volume of a solution of 0.08 part of sodium peroxodisulfate in 2 parts of water are initially taken in an autoclave equipped with a stirrer and having a capacity of 50 parts by volume. The mixture is heated at 60° C., and initial polymerization is carried out for 30 minutes. The remaining monomer emulsion and the remaining peroxodisulfate solution are then introduced uniformly in the course of 2 hours. Polymerization is continued at 60° C. until the solids content is about 38% (about 95% conversion of the monomers). The residual monomers are expelled from the resulting dispersion 2, after which this dispersion has a solids content of 40%. The soluble fraction of the polymer corresponds to 38%.

Dispersion 3

12 parts of water, 0.075 part of 80% strength tert.-butyl hydroperoxide, 0.03 part of sodium pyrophosphate and 15 parts by volume of an emulsion consisting of 31 parts of water, 15 parts of isoprene, 8.1 parts of acrylonitrile, 5.1 parts of styrene, 0.9 part of methacrylamide, 0.9 part of acrylic acid, 0.18 part of tert.-dodecylmercaptan, 0.45 part of sodium laurylsulfate and 0.45 part of sodium dodecylbenzenesulfonate are initially taken in an autoclave equipped with a stirrer and having a capacity of 160 parts by volume. The mixture is heated at 60° C., 1 part of a solution of 0.015 part of sodium ethylenediaminetetraacetate, 0.0075 part of iron(II) sulfate heptahydrate and 0.03 part of sodium formaldehydesulfoxylate dihydrate in 3 parts of water is added, and initial polymerization is carried out for 15 minutes. The remaining monomer emulsion and the solution of the reducing agent are then added in the course of 4 hours, and polymerization is continued at 60° C. until the solids content is 38.5% (97% conversion). The residual monomers are expelled from the resulting dispersion 3 under reduced pressure, after which this dispersion has a solids content of 39.5%. The soluble fraction of the carboxylated polymer corresponds to 52%.

Comparison dispersion (a)

1 part of water, 0.03 part of potassium peroxodisulfate, 2.5 parts by volume of an emulsion consisting of 10.4 parts of water, 5 parts of butadiene, 2.7 parts of acrylonitrile, 1.7 parts of styrene, 0.3 part of acrylic acid, 0.3 part of methacrylamide, 0.3 part of sodium laurylsulfate, 0.3 part of sodium dodecylbenzenesulfonate, 0.092 part of sodium sulfate and 0.03 part of tert.-dodecylmercaptan, and 0.2 part by volume of a solution of 0.0002 part of sodium formaldehydesulfoxylate, 0.0008 part of iron nitrate and 0.0006 part of sodium ethylenediaminetetraacetate in 2 parts of water are initially taken in an autoclave equipped with a stirrer and having a capacity of 50 parts by volume. The mixture is heated at 70° C., and initial polymerization is carried out for 15 minutes. The remaining monomer emulsion and the solution of the reducing agent are then introduced in the course of 4 hours, and polymerization is continued at 70° C. until the solids content is about 42% (about 95% conversion). The resultinig comparison dispersion (a) is freed from residual monomers. The carboxylated polymer present in the dispersion has a soluble fraction corresponding to 17%.

Comparison dispersion (b)

7.5 parts of water, 0.009 part of sodium peroxodisulfate and 2.5 parts by volume of a mixture consisting of 31.3 parts of water, 15 parts of butadiene, 8.1 parts of acrylonitrile, 5.1 parts of styrene, 0.9 part of acrylic acid, 0.9 part of methacrylamide, 0.45 part of sodium laurylsulfate, 0.45 part of sodium dodecylbenzenesulfonate and 0.45 part of tert.-dodecylmercaptan are initially taken in an autoclave equipped with a stirrer and having a capacity of 160 parts by volume. The mixture is heated at 55° C., and initial polymerization is carried out for 10 minutes. The remaining monomer emulsion is then introduced uniformly in the course of 2 hours, after which polymerization is continued at 55° C. until the solids content is about 42% (about 94% conversion). The resulting comparison dispersion (b) is freed from residual monomer by passing nitrogen through the mixture. The carboxylated polymer present in the dispersion has a soluble fraction corresponding to 73%.

Comparison dispersion (c)

18 parts of water, 5 parts of butadiene, 2.7 parts of acrylonitrile, 1.7 parts of styrene, 0.3 part of methacrylic acid, 0.3 part of methacrylamide, 0.05 part of tert.-dodecylmercaptan, 0.2 part of the sodium salt of a mixture of long-chain paraffin hydrocarbon sulfonic acids having a mean chain length of 15 carbon atoms, as an emulsifier, and 0.0025 part of sodium formaldehydesulfoxylate dihdrate and 0.005 part of tert.-butyl hydroperoxide are initially taken in a kettle equipped with a stirrer and having a capacity of 50 parts by volume. The mixture is heated at 35° C., and a reducing agent solution consisting of 0.0025 part of sodium formaldehydesulfoxylate dihydrate and 0.1 part of oxyethylated octylphenol (25 ethylene oxide radicals) in 0.9 part of water is added in the course of 2 hours, after which polymerization is continued at 35° C. until the solids content is 30.4% (about 86% conversion). The resulting comparison dispersion (c) is freed from residual monomers under reduced pressure. The carboxylated polymer dissolves completely in dimethylformamide.

II. FINISHING OF LEATHER

Examples 1 to 3 and Comparative Examples (a) to (c)

To finish splits, 100 parts of a commercial pigment formulation are stirred, in each case, with 600 parts of one of the above dispersions 1, 2, 3, (a), (b) and (c), 200 parts of water and 40 parts of a zinc oxide paste having the composition stated at the bottom of column 7 of U.S. Pat. No. 3,330,597. The mixture is applied to splits in an amount of 12 g/m$^2$ using a plush pad, the coating is plated at 80° C., and further mixture is then sprayed on in order to achieve complete covering power. After drying, embossing is carried out at 80° C. and under 200 bar with a 2 second interval. A conventional top season based on a nitrocellulose lacquer emulsion is finally applied.

To assess the stacking tack, the leather is dried after the final coating has been sprayed on, and is placed with the coated sides in contact and stored under a load of 5 $kg/cm^2$ for 18 hours at 40° C.

The behavior observed is rated as follows:

1=the film layers peel off when the leather is pulled apart,
2=strong adhesion, pronounced damage to the surfaces,
3=adhesion, slight damage to the surfaces,
4=slight adhesion without damage to the surfaces, and
5=no adhesion, no damage to the surfaces.

The wet and dry flexing endurances of the finished leather is rated in a conventional manner, using a Bally flexometer.

The values observed for the individual finishes are summarized in Table 1 for the Examples according to the invention, and in Table 2 for the Comparative Examples.

TABLE 1

| | Finishes according to the invention | | |
|---|---|---|---|
| | Flexing endurances (number of times flexed) | | Stacking tack |
| Example | wet | dry | Mark |
| 1 | 15,000 | 40,000 | 4-5 |
| 2 | 15,000 | 40,000 | 4-5 |
| 3 | 18,000 | 35,000 | 4 |

TABLE 2

| | Comparative finishes | | |
|---|---|---|---|
| Comparative | Flexing endurances (number of times flexed) | | Stacking tack |
| experiment | wet | dry | Mark |
| (a) | 1,000 | 15,000 | 4-5 |
| (b) | 15,000 | 15,000 | 2 |
| (c) | 2,000 | 40,000 | 1 |

If the dispersions 1, 2 and 3 are employed in accordance with the finishing method described in Examples 1 to 3, without the use of the zinc oxide dispersion but using an otherwise identical procedure, the finishes obtained on splits have virtually equally good physical fastness properties, although the processing properties are slightly inferior, i.e. a drop of 1 to 2 points in the stacking tack.

We claim:

1. In a process for finishing leather wherein a dispersion mixture is applied to the leather, and to the coated leather, an additional amount of the dispersion mixture is applied, the improvement which comprises applying to said leather a synthetic carboxylated rubber dispersion, which is prepared by emulsion polymerizing:

(A) from 1 to 10 parts by weight of one or more $\alpha,\beta$-monoethylenically unsaturated carboxylic acids of 3 to 5 carbon atoms, and (B) from 10 to 99 parts by weight of a mixture of:

(a) from 40 to 60 parts by weight of butadiene or isoprene or a mixture thereof, and (b) from 10 to 90 parts by weight of a mixture of styrene and acrylonitrile, the mixture containing not less than 10 parts by weight of stryene and up to 50 parts by weight of acrylonitrile, and removing the remaining monomers, and wherein said carboxylated rubber dispersion is prepared by the emulsion feed method with a conversion of greater than 90% such that said carboxylated rubber dispersion contains from 20 to 60% by weight of carboxylated rubber which is soluble in dimethylformamide at room temperature.

2. The process as claimed in claim 1, wherein in the synthetic rubber used, up to 25 parts by weight of the copolymerized water-insoluble monomers is replaced by other copolymerizable monomers, with the total amount of water-soluble additional monomers being not more than 10% by weight, based on the carboxylated rubber.

3. The process as claimed in claim 1, wherein said leather is treated with a rubber dispersion and a paste consisting of a mixture of metal oxides selected from the group of zinc oxide and magnesium oxide or metal hydroxides selected from the group consisting of zinc hydroxide and magnesium hydroxide or a mixture thereof, and wetting agents.

4. The process as claimed in claim 3, wherein said metal oxides and hydroxides are used in the amount of from 0.5 to 50% by weight, based on the solid carboxylated rubber.

5. The process as claimed in claim 1, wherein said $\alpha,\beta$-monoethylenically unsaturated carboxylic acid is selected from the group consisting of acrylic acid, methacrylic acid, maleic acid, or itaconic acid or a mixture thereof.

6. The process as claimed in claim 2, wherein the water-soluble additional monomer is selected from the group consisting of acrylamide, methacrylamide, N-methylolacrylamide, N-methylolacrylamide, N-methylolmethacrylamide, vinylsulfonic acid and the water-soluble salts thereof and allylsulfonic acid and the water-soluble salts thereof.

* * * * *